(12) United States Patent
Parsneau

(10) Patent No.: US 12,717,546 B1
(45) Date of Patent: Aug. 25, 2026

(54) TERNARY MULTIPLY-ACCUMULATE UNIT WITH ENCODING-BASED ZERO DETECTION AND ACCUMULATOR GATING

(71) Applicant: DTRMN LLC, Onalaska, WI (US)

(72) Inventor: John Parsneau, Onalaska, WI (US)

(73) Assignee: DTRMN LLC, Onalaska, WI (US)

( * ) Notice: Subject to any disclaimer, the term of this patent is extended or adjusted under 35 U.S.C. 154(b) by 0 days.

(21) Appl. No.: 19/554,513

(22) Filed: Mar. 2, 2026

(51) Int. Cl.
*G06F 7/544* (2006.01)

(52) U.S. Cl.
CPC .................................. *G06F 7/5443* (2013.01)

(58) Field of Classification Search
CPC ..................................................... G06F 7/5443
See application file for complete search history.

(56) References Cited

U.S. PATENT DOCUMENTS

| | | | |
|---|---|---|---|
| 4,608,659 A | 8/1986 | Bradley et al. | |
| 2004/0044717 A1 | 3/2004 | Makineni et al. | |
| 2009/0138772 A1 | 5/2009 | Bertacco et al. | |
| 2016/0019028 A1 | 1/2016 | Carlough et al. | |
| 2019/0065150 A1* | 2/2019 | Heddes | G06F 7/5443 |
| 2019/0205746 A1* | 7/2019 | Nurvitadhi | G06N 3/063 |
| 2020/0311523 A1* | 10/2020 | Hoang | G06F 7/496 |
| 2024/0176883 A1 | 5/2024 | Dolev et al. | |
| 2024/0303899 A1* | 9/2024 | Iyer | G06T 15/005 |

FOREIGN PATENT DOCUMENTS

| | | |
|---|---|---|
| CN | 119652311 | 3/2025 |
| RU | 2616887 | 4/2017 |
| SU | 455339 | 12/1974 |
| SU | 1137461 | 1/1985 |

OTHER PUBLICATIONS

A. Avizienis, "Arithmetic Error Codes: Cost and Effectiveness Studies for Application in Digital System Design" (1971), IEEE Transactions On Computers, vol. c-20, No. 11, 10 pages.
Albericio et al., "Bit-Pragmatic deep neural network computing" (2017), MICRO-50: The 50th Annual IEEE/ACM International Symposium on Microarchitecture, 14 pages.
Albericio et al., "Cnvlutin: Ineffectual-Neuron-Free Deep Neural Network Computing" (2016), ACM/IEEE 43rd Annual International Symposium on Computer Architecture, 13 pages.

(Continued)

*Primary Examiner* — Michael D. Yaary
(74) *Attorney, Agent, or Firm* — Foley & Lardner LLP

(57) ABSTRACT

A multiply-accumulate unit comprises a first input configured to receive a first operand encoded using a two-bit encoding scheme in which a ternary value is represented by two bits, wherein identical bits indicate a non-computable value and different bits indicate a computable value. The unit further comprises a second input for receiving a second operand, a zero detection circuit with a logic gate that compares the two bits and generates a skip signal when they are identical, an arithmetic circuit for performing accumulation based on both operands, an accumulator register for storing the result, and a gating circuit that selectively enables writing to the accumulator register based on the skip signal, preventing writing when the first operand is non-computable.

20 Claims, 5 Drawing Sheets

(56) References Cited

OTHER PUBLICATIONS

Brusentsov et al., "Ternary Computers: The Setun and the Setun 70," (2006), IFIP International Federation for Information Processing, 7 pages.
Brusentsov et al., "Ternary Dialectical Informatics," (2006), IFIP International Federation for Information Processing, 8 pages.
Brusentsov, et al., "Small Automatic Digital Machine 'Setun'," (circa 1962-1963), Moscow State University Computing Center, with English translation, 22 pages.
Brusentsov, N.P., "Threshold Implementation of Three-Valued Logic by Electromagnetic Means," (1972), Computational Engineering and Questions of Cybernetics, Issue 9 with English translation, 42 pages.
Chen et al., "Eyeriss: A Spatial Architecture for Energy-Efficient Dataflow for Convolutional Neural Networks" (2016), ACM/IEEE 43rd Annual International Symposium on Computer Architecture, 13 pages.
Courbariaux et al., "BinaryConnect: Training Deep Neural Networks with binary weights during propagations" (2015), 9 pages.
Eetha et al., "TileNET: Hardware zccelerator for ternary Convolutional Neural Networks" (2021), Microprocessors and Microsystems, 11 pages.
Frieder et al., "Algorithms for Binary Coded Balanced and Ordinary Ternary Operations," (1975), IEEE Transactions on Computers, pp. 212-215.
Hallworth et al., "Semiconductor Circuits for Ternary Logic," (1961), The Institution of Electrical Engineers, Monograph No. 482 E, vol. 109, Part C, pp. 219-225.
Halpern et al., "Ternary arithmetic unit," (1968), Proceedings of the IEE, vol. 115, No. 10, pp. 1385-1388.
Higuchi et al., "Static-Hazard-Free T-Gate for Ternary Memory Element and Its Application to Ternary Counters," (1977), IEEE Transactions on Computers, pp. 1212-1221.
Huang et al., "Algorithm-Based Fault Tolerance for Matrix Operations" (1984), IEEE Transactions On Computers, vol. c-33, No. 6, 11 pages.
Huang et al., "Redundant Algebra and Integrated Circuit Implementation of Ternary Logic and Their Applications," (1993), IEEE Journal of Solid-State Circuits, 4 pages.
Hurst, S.L., "Multiple-Valued Logic-Its Status and its Future," (1984), IEEE Transactions on Computers, vol. C-33, No. 12, pp. 1160-1179.
Jones, D.W., "Ternary Arithmetic," (2012), Web publication, Department of Computer Science, The University of Iowa, URL: https://homepage.cs.uiowa.edu/~dwjones/ternary/arith.shtml, 27 pages.
Judd et al., "Stripes: Bit-Serial Deep Neural Network Computing" (2016), IEEE Computer Architecture Letters, 4 pages.
Kim et al., "An Optimal Gate Design for the Synthesis of Ternary Logic Circuits," (2018), Proc. 23rd Asia South Pacific Design Automation Conf., pp. 476-481.
Knuth, D.E., "The Art of Computer Programming," (1997), Seminumerical Algorithms, vol. 2, 3rd edition, Addison-Wesley, 783 pages.
Lee et al., "CUNPU: An Energy-Efficient Deep Neural Network Accelerator With Fully Variable Weight Bit Precision" (2019), IEEE Journal of Solid-State Circuits, vol. 54, No. 1, 13 pages.
Li et al., "Ternary Weight Networks" (2023), ICASSP 2023—2023 IEEE International Conference on Acoustics, Speech and Signal Processing (ICASSP), 5 pages.
M. Nicolaidis, "Efficient implementations of self-checking adders and ALUs." (1993), IEEE, 10 pages.
Ma et al., "The Era of 1-bit LLMs: All Large Models are in 1.58 Bits" (2024), arXiv:2402.17764v1 [cs.CL], 8 pages.
Mitra et al., "Which concurrent error detection scheme to choose?" (2000), IEEE, 10 pages.
Nikitich, A. "Ternary Arithmetic," (2006), Tutorial, published online at neutec.narod.ru, with English translation, 12 pages.
Parhami et al., "Arithmetic with Binary-Encoded Balanced Ternary Numbers," (2013), Asilomar Conference on Signals, Systems, and Computers, pp. 1130-1133.
Parhami, B. "Truncated ternary multipliers," (2015), IET Computers & Digital Techniques, vol. 9, Iss. 2, pp. 101-105.
Parhami, B., "Computer Arithmetic: Algorithms and Hardware Designs," (2000), Chapter 3: Redundant No. Systems, Oxford University Press, 19 pages.
Patel et al., "Concurrent Error Detection in ALU’s by Recomputing with Shifted Operands" (1982), IEEE Transactions On Computers, vol. c-31, No. 7, 7 pages.
Porat, D.I., "Three-Valued digital systems," (1969), Proceedings of the IEE, vol. 116, No. 6, pp. 947-954.
Rastegari et al., "XNOR-Net: ImageNet Classification Using Binary Convolutional Neural Networks" (2016), 17 pages.
Reis et al., "SWIFT: Software Implemented Fault Tolerance" Proceedings of the International Symposium on Code Generation and Optimization (CGO '05), downloaded on Mar. 3, 2026 from IEEE Xplore, 12 pages.
Rozon et al., "Realization of a Three-Valued Logic Built-In Testing Structure," (1990), IEEE Journal of Solid-State Circuits, vol. 25, No. 3, pp. 814-820.
T. Austin, "Diva: A Reliable Substrate for Deep Submicron Microarchitecture Design" downloaded on Mar. 3, 2026 from IEEE Xplore, 12 pages.
T. Rao, "Error Coding for Arithmetic Processors" (1974), Academic Press Inc., 234 pages.
Umuroglu et al., "Finn: A Framework for Fast, Scalable Binarized Neural Network Inference" (2017), FPGA '17: The 2017 ACM/SIGDA International Symposium on Field-Programmable Gate Arrays, 11 pages.
Wei et al., "CT-MAC: CPU Renaissance via Table Lookup for Low-Bit LLM Deployment on Edge" (2025), EuroSys '25: Twentieth European Conference on Computer Systems, 16 pages.
Wu et al., "CMOS ternary logic circuits," (1990), IEE Proceedings, vol. 137, Pt. G, No. 1, pp. 21-27.
Yoon et al., "Optimizing Ternary Multiplier Design With Fast Ternary Adder," (2023), IEEE Transactions on Circuits and Systems-II: Express Briefs, vol. 70, No. 2, pp. 766-770.
Zhang et al., "TernaryCLIP: Efficiently Compressing Vision-Language Models with Ternary Weights and Distilled Knowledge" (2025), arXiv:2510.21879 v1 [cs.CV], 28 pages.
Zhao et al., "Efficient Ternary Logic Circuits Optimized by Ternary Arithmetic Algorithms," (2024), IEEE Transactions on Emerging Topics in Computing, vol. 12, No. 3, pp. 826-839.
Zhu et al., "Trained Ternary Quantization" (2017), Published as a conference paper at ICLR 2017, 10 pages.

* cited by examiner

TERNARY MULTIPLY-ACCUMULATE UNIT WITH ENCODING-BASED ZERO DETECTION AND ACCUMULATOR GATING

BACKGROUND

Neural network inference relies heavily on multiply-accumulate (MAC) operations, which dominate the computational workload in modern deep learning systems. As neural networks have grown in size and complexity, researchers have explored various quantization techniques to reduce the computational burden associated with these operations.

Ternary quantization represents one approach to reducing computational complexity, where neural network weights are constrained to three values: negative one, zero, and positive one. Networks employing ternary weights exhibit a characteristic property: a substantial fraction of the weights-often between fifty and seventy percent—are zero-valued. This sparsity pattern arises naturally from the training process and represents a potential opportunity for computational savings.

Despite the restricted value set in ternary neural networks, conventional hardware implementations route ternary operations through general-purpose multiplier circuits. This approach fails to exploit the mathematical simplicity inherent in ternary arithmetic: multiplication by positive one reduces to identity, multiplication by negative one reduces to negation, and multiplication by zero produces zero regardless of the other operand. General-purpose multipliers consume silicon area and power resources that exceed what ternary operations require.

When either operand in a multiply-accumulate operation is zero, the product contributes nothing to the accumulated result. In architectures that lack mechanisms to detect and bypass zero-valued operations, the accumulator register transitions on every clock cycle regardless of whether the operation produces a meaningful contribution. These unnecessary register transitions consume switching power without advancing the computation.

Existing approaches to zero detection in neural network accelerators examine all bits of each operand to determine whether the value equals zero. For operands with eight, sixteen, or more bits, this detection logic adds complexity and latency to the datapath. Furthermore, conventional zero-gating techniques provide power optimization without offering any mechanism to verify computational correctness. Binary neural networks, which restrict weights to two values rather than three, eliminate the zero state entirely. While this simplifies the arithmetic, it removes the opportunity to skip operations and reduces model accuracy compared to ternary approaches. There is a need for a multiply-accumulate architecture that exploits the structural properties of ternary encoding to detect zero-valued operands without examining all operand bits and that eliminates unnecessary accumulator register transitions to reduce power consumption.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The present disclosure provides a multiply-accumulate unit that employs a two-bit encoding scheme for ternary values, where the structural relationship between the two encoding bits directly indicates whether a value is computable. In this encoding, computable values (positive one and negative one) are represented by bit patterns having differing bits, while non-computable values (zero and reserved) are represented by bit patterns having identical bits. A zero detection circuit comprising a single logic gate, such as an XNOR gate, compares the two bits of an operand and generates a skip signal when the bits are identical, thereby detecting non-computable values without examining the full operand width. An arithmetic circuit performs accumulation operations using a sign extraction circuit that determines the product sign through an XOR operation on the most significant bits of the operands, eliminating the need for dedicated multiplier hardware. A gating circuit coupled to an accumulator register prevents writing to the register when the skip signal indicates a non-computable operand, thereby eliminating switching power consumption for zero-valued operations. This architecture provides a technical improvement over prior art approaches that route ternary operations through general-purpose multipliers and that detect zero operands by examining all bits of multi-bit operands, as the encoding-based detection reduces zero detection to a single gate per operand while the sign-based multiplication eliminates multiplier circuitry entirely.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure relates to multiply-accumulate unit architectures that employ a two-bit encoding scheme for representing ternary values. In such architectures, ternary values may include positive one, negative one, and zero. The two-bit encoding scheme may encode these ternary values such that a structural relationship between the two encoding bits indicates whether a value is computable or non-computable. In some cases, computable values (positive one and negative one) are represented by bit patterns in which the two bits differ from each other, while non-computable values (zero and a reserved state) are represented by bit patterns in which the two bits are identical.

This structural property of the encoding scheme may enable zero detection using a single logic gate per operand. In some cases, an XNOR gate may compare the two bits of an encoded operand and generate a skip signal when the bits are identical, indicating a non-computable value. The single-gate detection approach may detect both zero values and reserved encoding states without additional circuitry, as both non-computable states share the same bit-level signature of identical bits.

The skip signal generated by the zero detection circuitry may be used to gate an accumulator register. In some cases, a gating circuit may selectively enable or disable writing to the accumulator register based on the skip signal. When the skip signal indicates that an operand is a non-computable value, the gating circuit may prevent writing to the accumulator register, causing the accumulator register to maintain its prior value. This conditional accumulation approach may reduce switching power consumption by eliminating register transitions for operations involving zero-valued operands.

The multiply-accumulate unit architecture may perform ternary multiplication without dedicated multiplier hardware. In some cases, a sign extraction circuit may determine the sign of a product by performing an XOR operation on the most significant bits of two operands encoded using the two-bit encoding scheme. The most significant bit may distinguish positive one from negative one in the encoding, and the XOR operation may produce a result indicating whether the product is positive or negative. An adder-subtractor circuit may then selectively add or subtract a value to or from the accumulator register based on the determined sign, thereby implementing ternary multiplication using addition and subtraction operations rather than dedicated multiplication circuitry.

Figure 1:
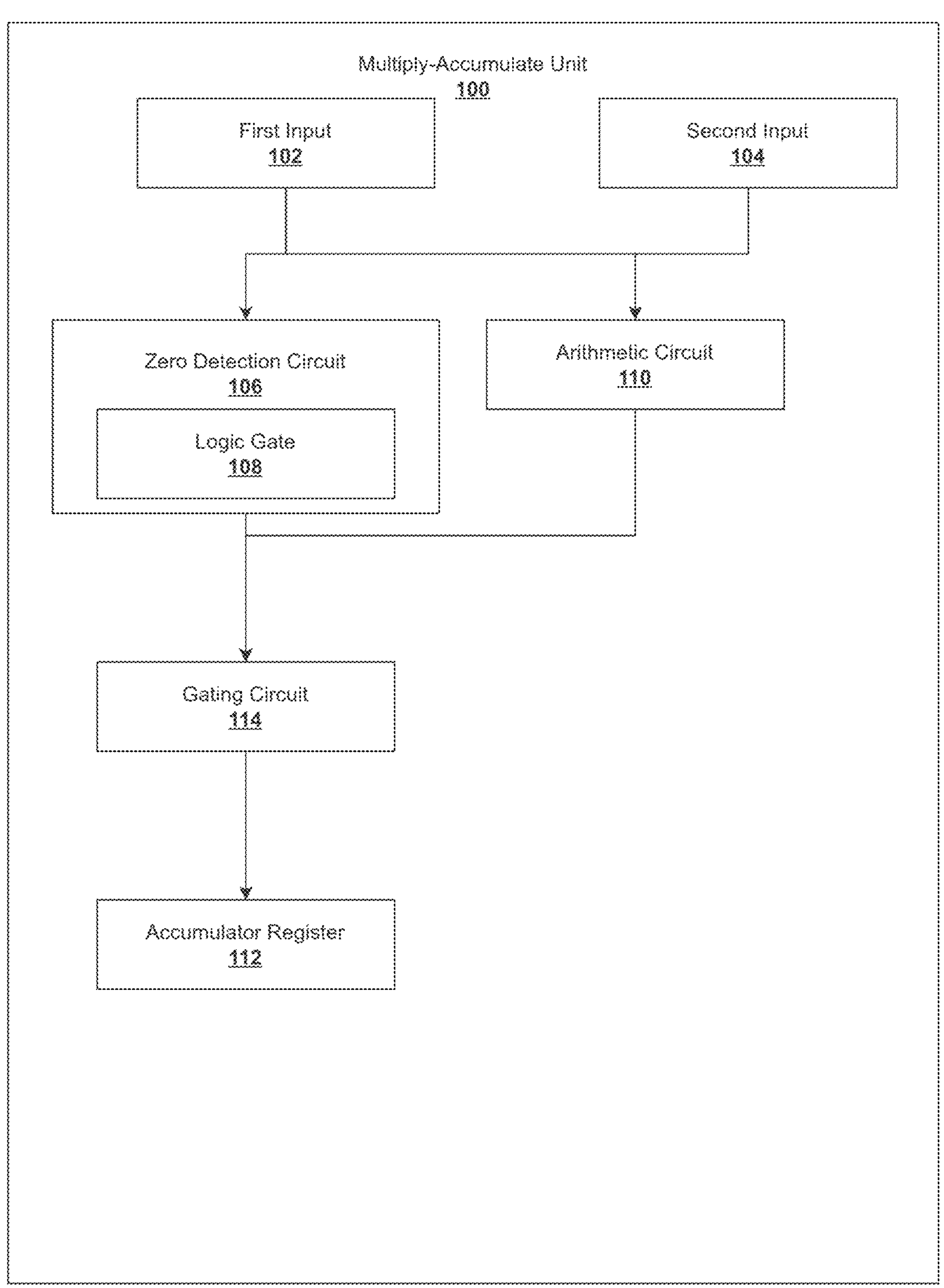
FIG. 1 illustrates a block diagram of a multiply-accumulate unit, according to aspects of the present disclosure.

Referring to FIG. 1, a multiply-accumulate unit 100 includes a first input 102, a second input 104, a zero detection circuit 106, an arithmetic circuit 110, an accumulator register 112, and a gating circuit 114. The first input 102 may be configured to receive a first operand encoded using a two-bit encoding scheme in which a ternary value is represented by two bits. In the two-bit encoding scheme, the two bits being different indicates a computable value and the two bits being identical indicates a non-computable value. The second input 104 may be configured to receive a second operand.

The two-bit encoding scheme may encode ternary values such that computable values of positive one and negative one are represented by bit patterns having differing bits, while non-computable values including zero and a reserved state are represented by bit patterns having identical bits. In some cases, the two-bit encoding scheme may encode a zero value as a bit pattern 00, positive one as a bit pattern 01, negative one as a bit pattern 10, and a reserved value as a bit pattern 11. The two-bit encoding scheme may use any assignment of {−1, 0, +1, reserved} to the four bit patterns that satisfies the structural property where computable values have differing bits and non-computable values have identical bits.

With continued reference to FIG. 1, the zero detection circuit 106 includes a logic gate 108. The logic gate 108 may be configured to compare the two bits of the first operand and generate a skip signal when the two bits are identical. In some cases, the logic gate 108 comprises an XNOR gate that outputs a logic high value when the two bits of the first operand are identical. The XNOR gate may detect both zero values and reserved encoding states as non-computable values, as both states share the identical-bits signature.

In some cases, the second operand received at the second input 104 may be encoded using the two-bit encoding scheme. The zero detection circuit 106 may further comprise a second logic gate configured to compare two bits of the second operand and generate a second skip signal when the two bits of the second operand are identical. The multiply-accumulate unit 100 may further comprise a combining circuit configured to combine the skip signal and the second skip signal to produce a combined skip signal. In some cases, the combining circuit comprises an OR gate.

The arithmetic circuit 110 may be configured to perform an accumulation operation based on the first operand and the second operand. In some cases, the arithmetic circuit 110 comprises a sign extraction circuit configured to determine a sign of a product of the first operand and the second operand based on a most significant bit of the first operand and a most significant bit of the second operand. The sign extraction circuit may comprise an XOR gate configured to receive the most significant bit of the first operand and the most significant bit of the second operand. The arithmetic circuit 110 may further comprise an adder-subtractor circuit configured to selectively add or subtract a value to or from a current value of the accumulator register 112 based on the sign determined by the sign extraction circuit.

The arithmetic circuit 110 may process wider activations such as INT8 or INT16 through bitplane decomposition. In bitplane decomposition, each binary activation bit may be treated as a ternary operand with bit=0 mapping to ternary zero encoding (00) and bit=1 mapping to ternary+1 encoding (01). The arithmetic circuit 110 may recombine bit-plane results using a fixed positional shift of one left-shift per plane rather than a barrel shifter, eliminating multiplier logic in the recombination stage.

As further shown in FIG. 1, the accumulator register 112 may be configured to store a result of the accumulation operation. The accumulator register 112 bit width may be configured as $[\log_2(N+1)]$ bits for a pure ternary dot product of N elements. The accumulator register 112 bit width may be configured with additional bits to accommodate positional shift values when processing wider activations via bitplane decomposition.

The gating circuit 114 may be configured to selectively enable writing to the accumulator register 112 based on the skip signal. The gating circuit 114 may prevent writing to the accumulator register 112 when the skip signal indicates that the first operand is a non-computable value. When the combined skip signal is used, the gating circuit 114 may prevent writing to the accumulator register 112 when the combined skip signal indicates that at least one of the first operand or the second operand is a non-computable value. When writing is prevented, the accumulator register 112 may maintain its prior value without performing a write operation.

The multiply-accumulate unit 100 may be implemented using standard digital logic primitives including registers, adders, and XOR/XNOR gates without any vendor-specific hard IP. This implementation approach may enable the multiply-accumulate unit 100 to be implemented in any FPGA, ASIC, or structured-ASIC process. The multiply-accumulate unit 100 may operate without using any dedicated multiplier or DSP resources.

The encoding-based zero detection and sign extraction operate at the individual multiply unit and produce the same skip signal and product sign regardless of how products are subsequently accumulated. Because every non-zero ternary product has unit magnitude and every zero product is the additive identity of integer addition, a zero-valued product contributes no net change to any accumulation result regardless of the structure through which it propagates. This property holds for per-unit accumulator registers gated by write-enable as described above, combinational adder trees where zero inputs propagate as additive identity, registers with unified clock-enable where zero-valued deltas cause no bit transitions, systolic pipelines where zero products pass through stages without altering partial sums, hierarchical or tiled reduction where zero is identity at every level, sequential or time-multiplexed shared accumulators where zero products cause zero-add cycles, prefix-sum or other parallel reduction network topologies, and any combination thereof. The power savings manifest identically across all topologies: whether by preventing register transitions through write-enable gating, by eliminating switching at adder tree inputs through zero-injection, or by adding zero-valued deltas that cause no bit transitions.

Figure 2:
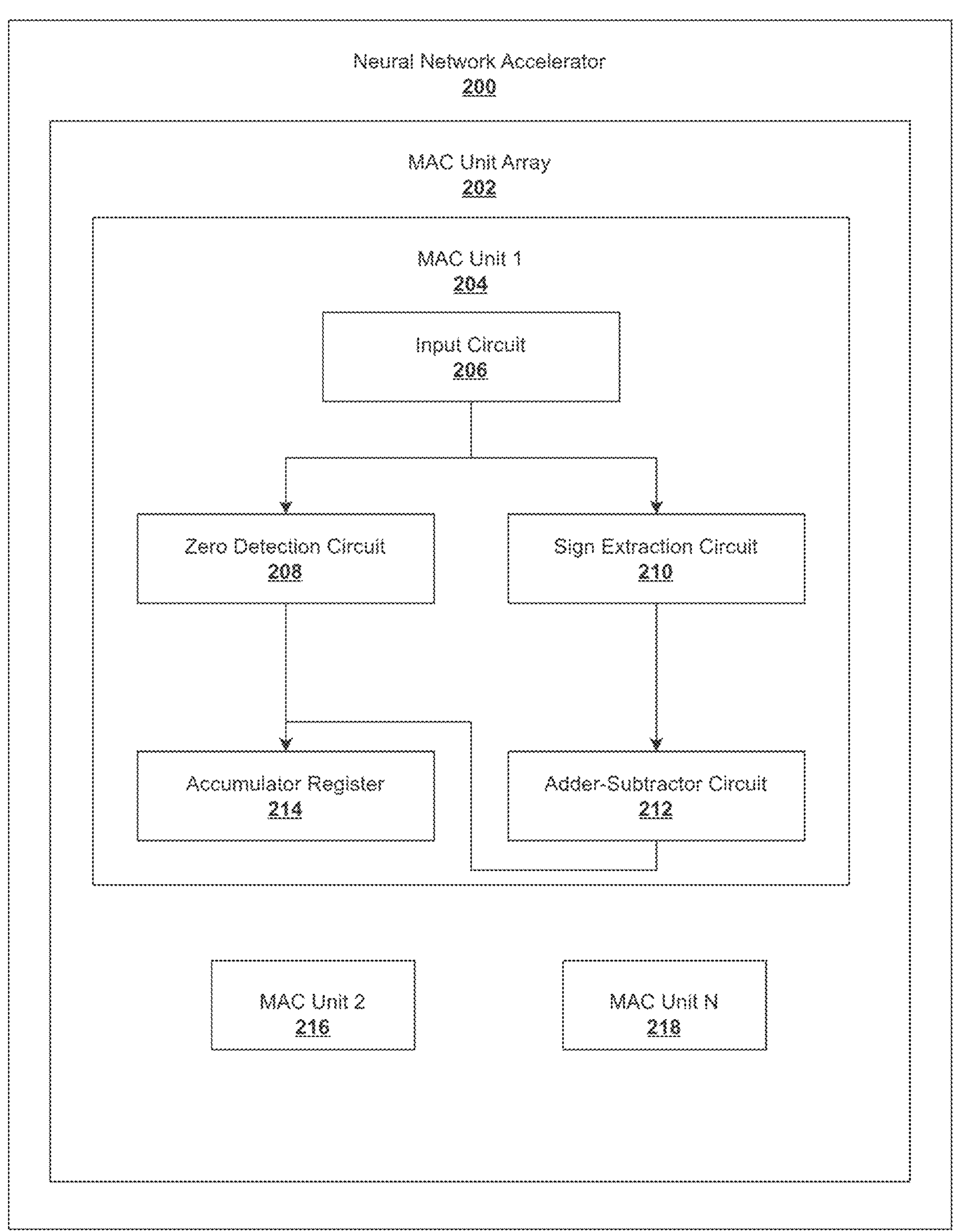
FIG. 2 illustrates a block diagram of a neural network accelerator with a multiply-accumulate unit array, according to aspects of the present disclosure.

Referring to FIG. 2, a neural network accelerator 200 includes a MAC unit array 202 containing a plurality of multiply-accumulate units arranged in parallel. The MAC unit array 202 comprises a MAC unit 1 204, a MAC unit 2 216, and a MAC unit N 218. The neural network accelerator 200 may be configured for neural network inference applications such as TernaryCLIP ViT-B/16 patch embedding with ternary weight by INT16 activation operations. The neural network accelerator 200 may also be configured for combinatorial optimization applications using Ising model formulation for MAXCUT problems with ternary by ternary operations.

With continued reference to FIG. 2, the MAC unit 1 204 includes an input circuit 206, a zero detection circuit 208, a sign extraction circuit 210, an adder-subtractor circuit 212, and an accumulator register 214. The input circuit 206 may be configured to receive a first operand encoded using a two-bit ternary encoding in which computable ternary values of positive one and negative one are represented by bit patterns having differing bits and non-computable values are represented by bit patterns having identical bits. The two-bit ternary encoding may encode a zero value as a bit pattern of two identical bits and may encode a reserved value as a different bit pattern of two identical bits.

The zero detection circuit 208 comprises an XNOR gate configured to detect when the first operand has identical bits and generate a skip signal. The XNOR gate may detect both the zero value and the reserved value as non-computable values, as both states share the identical-bits signature. In some cases, the MAC unit 1 204 may further comprise a second zero detection circuit comprising a second XNOR gate configured to detect when a second operand has identical bits and generate a second skip signal. The MAC unit 1 204 may further comprise an OR gate configured to combine the skip signal and the second skip signal to produce a combined skip signal.

As further shown in FIG. 2, the sign extraction circuit 210 may be configured to determine a sign of a product based on a most significant bit of the first operand. The sign extraction circuit 210 may comprise an XOR gate configured to receive the most significant bit of the first operand and a most significant bit of the second operand. The adder-subtractor circuit 212 may be configured to selectively add or subtract a second operand based on the sign determined by the sign extraction circuit 210.

The accumulator register 214 has a write-enable input coupled to the skip signal. The write-enable input may be deasserted when the skip signal indicates the first operand is a non-computable value. When the combined skip signal is used, the write-enable input may be deasserted when either the skip signal or the second skip signal indicates a non-computable value. The combined skip signal may be coupled to the write-enable input of the accumulator register 214.

With continued reference to FIG. 2, the MAC unit 2 216 and the MAC unit N 218 may be configured similarly to the MAC unit 1 204. Each multiply-accumulate unit in the MAC unit array 202 may include an input circuit, a zero detection circuit, a sign extraction circuit, an adder-subtractor circuit, and an accumulator register configured as described for the MAC unit 1 204.

The neural network accelerator 200 may be implemented with 768 parallel MAC units at 50 MHz clock frequency on an Intel Agilex 5 FPGA using a FinFET process. In such an implementation, the neural network accelerator 200 may use approximately 32,500 ALMs with zero DSP blocks. The neural network accelerator 200 may alternatively be implemented with 768 parallel MAC units at 100 MHz clock frequency on a Xilinx Kintex-7 FPGA using a planar CMOS process. In such an implementation, the neural network accelerator 200 may use approximately 62,124 LUTs with zero DSP blocks and may employ per-MAC accumulator registers with write-enable gating. The neural network accelerator 200 may alternatively be implemented with 2048 parallel MAC units at 125 MHz clock frequency on a Xilinx Kintex-7 FPGA using a planar CMOS process. In such an implementation, the neural network accelerator 200 may use approximately 101,213 LUTs with zero DSP blocks.

The neural network accelerator 200 may achieve skip rates of 70-85% for neural network inference workloads depending on weight sparsity and activation bit sparsity from bitplane decomposition. The neural network accelerator 200 may achieve skip rates of 97-99% or higher for Ising machine workloads depending on coupling matrix sparsity of the graph structure.

The neural network accelerator 200 may include a hardware verification subsystem referred to as TABS that maintains a four-component tuple (T, A, B, S). In the TABS tuple, T represents total operations submitted, A represents a signed aggregate of non-zero outputs, wherein each positive output contributes plus one and each negative output contributes minus one, B represents a weighted aggregate sum, and S represents a count of skipped operations. The T and S counters may reset on power-on via a dedicated POR domain separate from soft reset, with no software write path, providing anti-tamper protection. The T and S counters may be monotonic and increment-only. In alternative implementations, the TABS counters may be partitioned across reset domains—for example, T and S in a power-on reset domain while A and B are in a software-resettable domain—or all counters may be in a software-resettable domain. The algebraic verification properties hold identically regardless of the reset domain architecture.

The TABS verification subsystem may compute the A component by scanning the current accumulator state where $A=\Sigma acc[i]$. The TABS verification subsystem may compute the B component as a weighted aggregate sum $B=\Sigma s[i]\times acc[i]$ using a sign vector where each accumulator value is conditionally negated based on a single-bit-per-accumulator control vector. The sign vector $s[i] \in \{-1, +1\}$ may be derived from the control vector via conditional negate where bit=1 adds and bit=0 subtracts.

The TABS verification subsystem may verify computation integrity using five algebraic constraints. Let $E=T-S$ represent executed operations. The five constraints include: S≤T (non-negativity), |A|≤E (boundedness of A), |B|≤E (boundedness of B), (E+A) mod2=0 (parity of A), and (E+B) mod2=0 (parity of B).

The TABS verification subsystem may provide unique decomposition of operation counts where $n^{+}=(E+A)/2$ gives an exact count of +1 products and $n^{-}=(E-A)/2$ gives an exact count of −1 products. No other pair of non-negative integers summing to E may be consistent with the observed (E, A) values.

TABS tuples may be additively composed across bit-planes, time windows, and distributed nodes. The composition operation $C_1 \oplus C_2=(T_1+T_2, A_1+A_2, B_1+B_2, S_1+S_2)$ may produce a valid tuple whenever both input tuples are valid.

In pipelined implementations where a pipeline register introduces latency between the product computation and the accumulation, the verification counters may be selectively gated to exclude pipeline flush cycles, preventing double-counting of operations during pipeline drain.

The B component mechanism may be used for multiple application domains including Ising energy computation, expert consensus, matched filtering, pattern correlation, signed feature aggregation, and conflict detection without hardware reconfiguration by changing the sign vector. The sign vector may be an external input whose meaning the hardware does not interpret.

Figure 3:
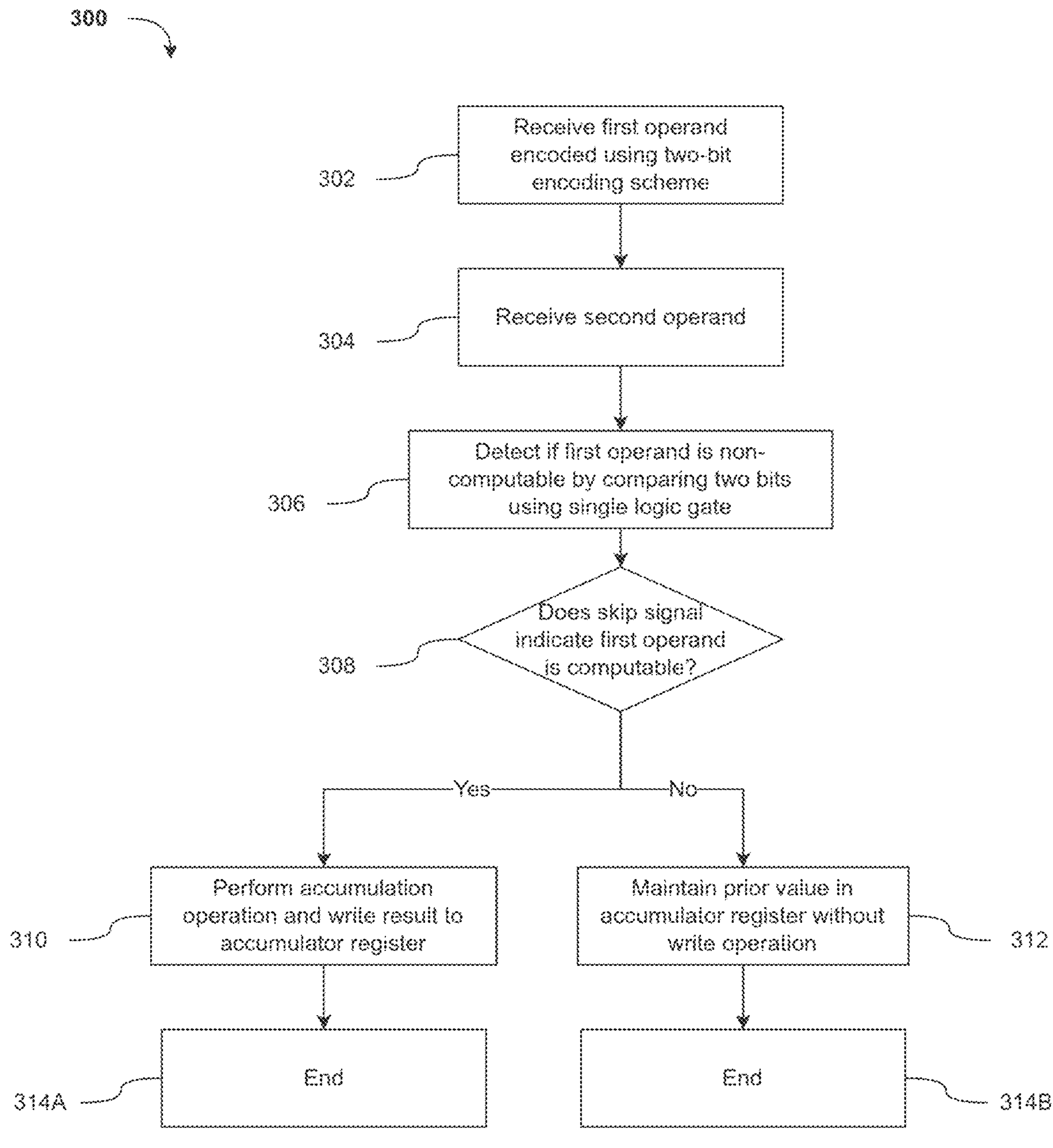
FIG. 3 illustrates a flowchart of a method for performing multiply-accumulate operations, according to aspects of the present disclosure.

Referring to FIG. 3, a method 300 for performing multiply-accumulate operations includes a step 302, a step 304, a step 306, a step 308, a step 310, a step 312, and a step 314. The method 300 may be performed by a multiply-accumulate unit such as the multiply-accumulate unit 100 described above with reference to FIG. 1.

At step 302, the method 300 includes receiving a first operand encoded using a two-bit encoding scheme in which ternary values are represented by two bits. In the two-bit encoding scheme, differing bits indicate a computable value and identical bits indicate a non-computable value. As described previously, the two-bit encoding scheme may encode a zero value as two identical bits and may encode positive one and negative one as two different bits. In some cases, the two-bit encoding scheme may encode zero as bit pattern 00, positive one as bit pattern 01, negative one as bit pattern 10, and a reserved value as bit pattern 11.

At step 304, the method 300 includes receiving a second operand. The second operand may be encoded using the same two-bit encoding scheme as the first operand, or the second operand may be encoded using a different encoding scheme such as an integer encoding for activation values.

With continued reference to FIG. 3, at step 306, the method 300 includes detecting whether the first operand is a non-computable value by comparing the two bits of the first operand using a single logic gate to generate a skip signal. In some cases, detecting whether the first operand is a non-computable value comprises performing an XNOR operation on the two bits of the first operand. The XNOR operation may output a logic high value when the two bits are identical and may output a logic low value when the two bits differ.

For example, when the first operand has bit pattern 00 (encoding zero), the XNOR operation compares bit 0 with bit 0 and produces a logic high output indicating identical bits. When the first operand has bit pattern 11 (encoding the reserved value), the XNOR operation compares bit 1 with bit 1 and produces a logic high output indicating identical bits. In both cases, the skip signal indicates a non-computable value. When the first operand has bit pattern 01 (encoding positive one), the XNOR operation compares bit 0 with bit 1 and produces a logic low output indicating differing bits. When the first operand has bit pattern 10 (encoding negative one), the XNOR operation compares bit 1 with bit 0 and produces a logic low output indicating differing bits. In both cases, the skip signal indicates a computable value.

As further shown in FIG. 3, at decision step 308, the method 300 evaluates whether the skip signal indicates the first operand is computable. The decision step 308 may branch to different subsequent steps based on the value of the skip signal.

When the skip signal indicates the first operand is a computable value (Yes branch from step 308), the method 300 proceeds to step 310. At step 310, the method 300 includes performing an accumulation operation and writing a result to an accumulator register. The accumulation operation may include determining a sign of a product based on the most significant bits of the operands and selectively adding or subtracting a value to or from a current value of the accumulator register based on the determined sign.

When the skip signal indicates the first operand is a non-computable value (No branch from step 308), the method 300 proceeds to step 312. At step 312, the method 300 includes maintaining a prior value in the accumulator register without performing a write operation. By preventing the write operation, the accumulator register may retain its prior value and switching power associated with register transitions may be eliminated for operations involving non-computable operands.

The method 300 concludes at step 314. As shown in FIG. 3, step 314 may be reached from either step 310 (shown as step 314A) or step 312 (shown as step 314B). After step 314, the method 300 may return to step 302 to process additional operand pairs in a sequence of multiply-accumulate operations.

Figure 4:
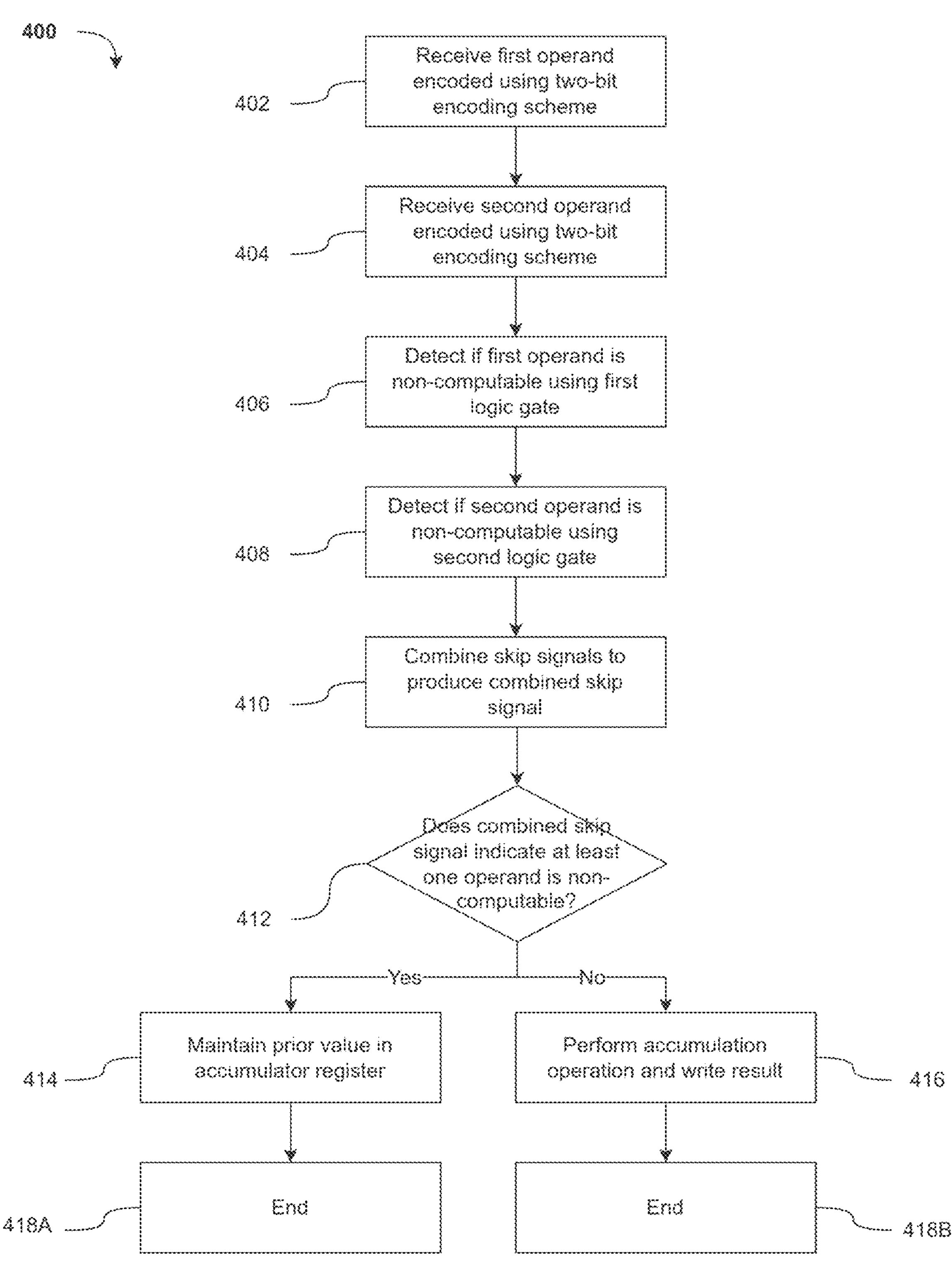
FIG. 4 illustrates a flowchart of a method for performing multiply-accumulate operations with dual operand zero detection, according to aspects of the present disclosure.

Referring to FIG. 4, a method 400 for performing multiply-accumulate operations with dual operand zero detection includes a step 402, a step 404, a step 406, a step 408, a step 410, a step 412, a step 414, a step 416, and a step 418. The method 400 may be performed by a multiply-accumulate unit such as the multiply-accumulate unit 100 described above with reference to FIG. 1.

At step 402, the method 400 includes receiving a first operand encoded using a two-bit encoding scheme. As described previously, the two-bit encoding scheme represents ternary values using two bits, where differing bits indicate a computable value and identical bits indicate a non-computable value. The two-bit encoding scheme may encode a zero value as two identical bits and may encode positive one and negative one as two different bits.

At step 404, the method 400 includes receiving a second operand encoded using the two-bit encoding scheme. The second operand may be encoded using the same two-bit encoding scheme as the first operand, such that both operands share the structural property where computable values have differing bits and non-computable values have identical bits.

With continued reference to FIG. 4, at step 406, the method 400 includes detecting whether the first operand is a non-computable value using a first logic gate. The first logic gate may compare the two bits of the first operand and generate a skip signal when the two bits are identical. In some cases, the first logic gate comprises an XNOR gate that outputs a logic high value when the two bits of the first operand are identical.

At step 408, the method 400 includes detecting whether the second operand is a non-computable value by comparing two bits of the second operand using a second logic gate to generate a second skip signal. The second logic gate may compare the two bits of the second operand and generate the second skip signal when the two bits of the second operand are identical. In some cases, the second logic gate comprises an XNOR gate that outputs a logic high value when the two bits of the second operand are identical.

As further shown in FIG. 4, at step 410, the method 400 includes combining the skip signal and the second skip signal to produce a combined skip signal. In some cases, an OR gate may combine the skip signal and the second skip signal. The OR gate may output a logic high value for the combined skip signal when either the skip signal or the second skip signal indicates a non-computable value. The OR gate may output a logic low value for the combined skip signal when both the skip signal and the second skip signal indicate computable values.

At decision step 412, the method 400 evaluates whether the combined skip signal indicates that at least one operand is non-computable. The decision step 412 may branch to different subsequent steps based on the value of the combined skip signal.

When the combined skip signal indicates that at least one of the first operand or the second operand is a non-computable value (Yes branch from step 412), the method 400 proceeds to step 414. At step 414, the method 400 includes maintaining the prior value in the accumulator register. By preventing the write operation when at least one operand is non-computable, the accumulator register may retain its prior value and switching power associated with register transitions may be eliminated for operations involving non-computable operands. The method 400 then concludes at step 418A.

When the combined skip signal indicates that both operands are computable values (No branch from step 412), the method 400 proceeds to step 416. At step 416, the method 400 includes performing the accumulation operation and writing a result to the accumulator register. The accumulation operation may include determining a sign of a product based on the most significant bits of the operands and selectively adding or subtracting a value to or from a current value of the accumulator register based on the determined sign. The method 400 then concludes at step 418B. After step 418, the method 400 may return to step 402 to process additional operand pairs in a sequence of multiply-accumulate operations.

Figure 5:
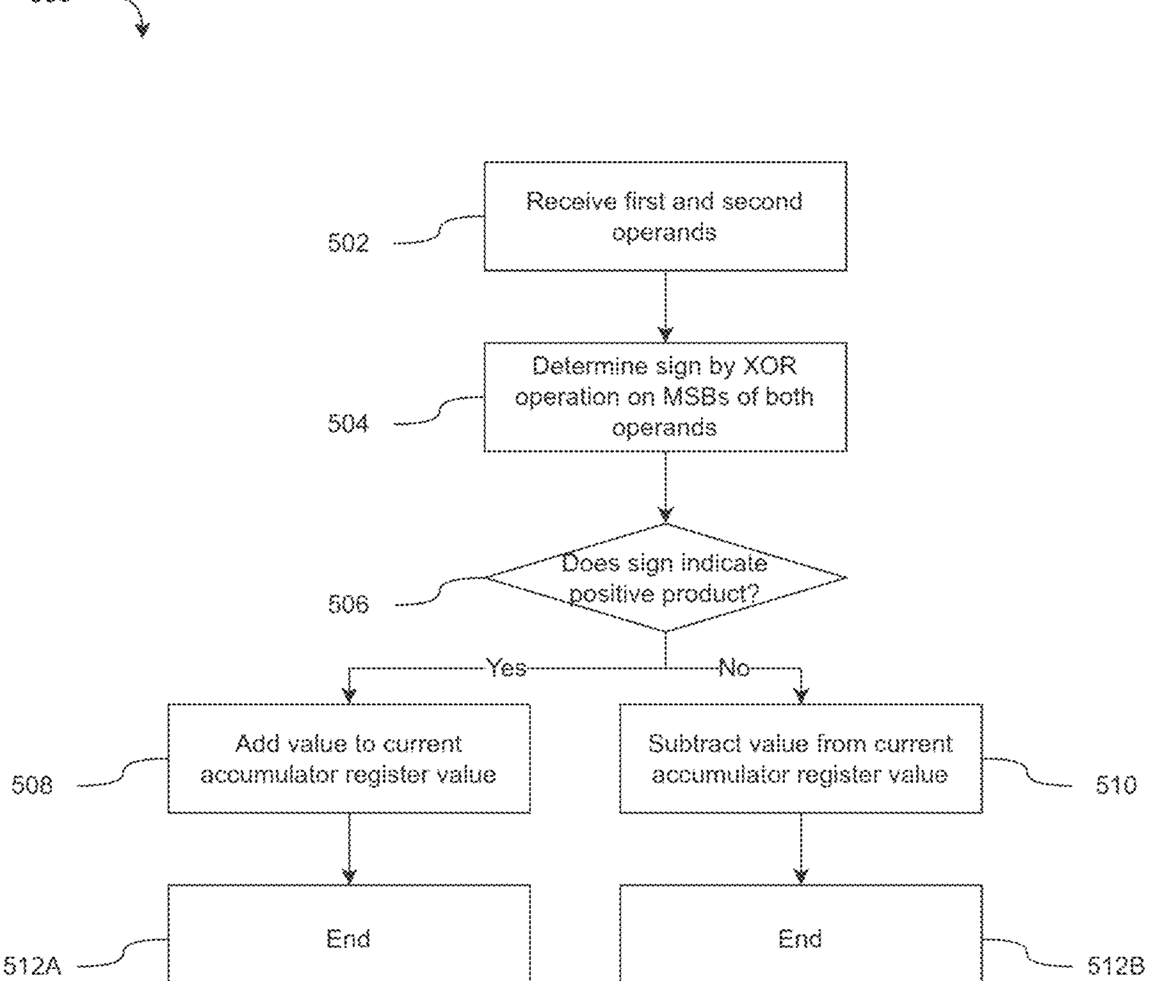
FIG. 5 illustrates a flowchart of a method for performing multiply-accumulate operations with sign-based selective addition or subtraction, according to aspects of the present disclosure.

Referring to FIG. 5, a method 500 for performing multiply-accumulate operations with sign-based selective addition or subtraction includes a step 502, a step 504, a step 506, a step 508, a step 510, and a step 512. The method 500 may be performed by a multiply-accumulate unit such as the multiply-accumulate unit 100 described above with reference to FIG. 1.

At step 502, the method 500 includes receiving first and second operands. The first operand and the second operand may each be encoded using the two-bit encoding scheme described previously, where differing bits indicate a computable value and identical bits indicate a non-computable value. The two-bit encoding scheme may encode positive one and negative one as bit patterns having differing bits, with the most significant bit (MSB) distinguishing positive one from negative one.

At step 504, the method 500 includes determining a sign of a product of the first operand and the second operand by performing an XOR operation on a most significant bit of the first operand and a most significant bit of the second operand. The XOR operation may produce a result indicating whether the product of the two operands is positive or negative. When the MSBs of both operands are the same (both 0 or both 1), the XOR operation produces a logic low output indicating a positive product. When the MSBs of both operands differ (one is 0 and one is 1), the XOR operation produces a logic high output indicating a negative product.

With continued reference to FIG. 5, at decision step 506, the method 500 evaluates whether the sign indicates a positive product. The decision step 506 may branch to different subsequent steps based on the result of the XOR operation performed at step 504.

When the sign indicates a positive product (Yes branch from step 506), the method 500 proceeds to step 508. At step 508, the method 500 includes adding a value to a current value of the accumulator register. The value added may correspond to the magnitude of the activation operand or a unit value depending on the operand types being processed.

When the sign does not indicate a positive product (No branch from step 506), the method 500 proceeds to step 510. At step 510, the method 500 includes subtracting a value from the current value of the accumulator register. The value subtracted may correspond to the magnitude of the activation operand or a unit value depending on the operand types being processed.

As further shown in FIG. 5, the method 500 concludes at step 512. Step 512 may be reached from either step 508 (shown as step 512A) or step 510 (shown as step 512B). After step 512, the method 500 may return to step 502 to process additional operand pairs in a sequence of multiply-accumulate operations.

The XOR-based sign extraction performed at step 504 may eliminate the need for dedicated multiplier hardware. In ternary arithmetic where operand values are restricted to positive one, negative one, and zero, the product of two non-zero operands has unit magnitude and the sign of the product is determined by the signs of the operands. The MSB of each operand in the two-bit encoding scheme encodes the sign information, and the XOR operation on the two MSBs computes the sign of the product using a single logic gate. The adder-subtractor circuit may then selectively add or subtract based on the determined sign, thereby implementing ternary multiplication through addition and subtraction operations rather than dedicated multiplication circuitry.

As described previously with reference to the method 400, performing the accumulation operation may comprise determining a sign of a product of the first operand and the second operand by performing an XOR operation on a most significant bit of the first operand and a most significant bit of the second operand, and selectively adding or subtracting a value to or from a current value of the accumulator register based on the determined sign. The method 500 may be combined with the dual operand zero detection described in the method 400, such that the sign-based selective addition or subtraction of the method 500 is performed when the combined skip signal indicates that both operands are computable values.

The multiply-accumulate unit operates through coordinated interaction of the zero detection circuit, the arithmetic circuit, the gating circuit, and the accumulator register to perform ternary multiply-accumulate operations with conditional accumulation based on operand computability.

Signal flow through the multiply-accumulate unit begins at the inputs where encoded operands are received. The first operand and the second operand may each be encoded using the two-bit encoding scheme where the structural relationship between the two encoding bits indicates computability.

The encoded operands are routed to both the zero detection circuit and the arithmetic circuit in parallel, enabling simultaneous detection of non-computable values and preparation of arithmetic results.

The zero detection circuit receives the two bits of each encoded operand and performs a comparison using a single logic gate per operand. The logic gate may comprise an XNOR gate that compares the two bits and produces a skip signal based on whether the bits are identical or different. When the two bits are identical, the XNOR gate outputs a logic high value indicating a non-computable value. When the two bits differ, the XNOR gate outputs a logic low value indicating a computable value. The single-gate detection approach exploits the structural property of the encoding scheme where both zero values and reserved encoding states share the identical-bits signature, enabling detection of both non-computable states without additional circuitry or explicit value comparison.

When both operands are encoded using the two-bit encoding scheme, the zero detection circuit may include two XNOR gates operating in parallel, one for each operand. The skip signals from both XNOR gates may be combined using an OR gate to produce a combined skip signal. The OR gate outputs a logic high value for the combined skip signal when either operand is non-computable, and outputs a logic low value when both operands are computable. The combined skip signal propagates to the gating circuit to control accumulator register write operations.

The arithmetic circuit receives the encoded operands and prepares the arithmetic result for potential accumulation. The sign extraction circuit within the arithmetic circuit receives the most significant bit of each operand and performs an XOR operation to determine the sign of the product. In the two-bit encoding scheme, the most significant bit distinguishes positive one from negative one among the computable values. The XOR operation on the two most significant bits produces a result indicating whether the product is positive or negative. When both most significant bits are the same, the XOR operation produces a logic low output indicating a positive product. When the most significant bits differ, the XOR operation produces a logic high output indicating a negative product.

The sign extraction circuit enables multiplier-free ternary multiplication by exploiting the unit-magnitude property of ternary arithmetic. In ternary arithmetic where operand values are restricted to positive one, negative one, and zero, the product of two non-zero operands has magnitude one and the sign of the product is determined by the signs of the operands. The XOR operation computes the sign of the product using a single logic gate, eliminating the need for dedicated multiplier hardware or DSP resources.

The adder-subtractor circuit receives the sign determination from the sign extraction circuit and selectively adds or subtracts a value to or from the current value of the accumulator register. When the sign indicates a positive product, the adder-subtractor circuit performs an addition operation. When the sign indicates a negative product, the adder-subtractor circuit performs a subtraction operation. The value added or subtracted may correspond to the magnitude of an activation operand when processing ternary weight by integer activation operations, or may correspond to a unit value when processing ternary by ternary operations.

The gating circuit receives the skip signal or combined skip signal from the zero detection circuit and controls the write-enable input of the accumulator register. When the skip signal indicates that at least one operand is a non-computable value, the gating circuit deasserts the write-enable input, preventing the accumulator register from updating. When the skip signal indicates that both operands are computable values, the gating circuit asserts the write-enable input, enabling the accumulator register to store the result from the adder-subtractor circuit.

The conditional accumulation approach implemented by the gating circuit eliminates switching power for operations involving non-computable operands. When the write-enable input is deasserted, the accumulator register maintains its prior value without performing a write operation. The register contents do not toggle, and the switching power associated with register transitions is eliminated. The power savings from conditional accumulation may be proportional to the skip rate, which depends on the sparsity of the operands in the workload being processed.

In alternative implementations, the accumulator register may be written unconditionally on every clock cycle, with the skip signal causing a zero-valued delta to be presented to the adder input. Because adding zero does not change the register contents, the register value is maintained without transitioning, and switching power associated with the register is not consumed. This unconditional-write approach achieves functionally equivalent power reduction to write-enable gating while permitting a unified clock-enable signal shared across all accumulator registers in a parallel arrangement.

The timing of signal propagation through the multiply-accumulate unit may be arranged such that the skip signal is available at the gating circuit before the arithmetic result is ready for writing. The zero detection circuit may have lower propagation delay than the arithmetic circuit because the zero detection circuit uses a single logic gate per operand while the arithmetic circuit includes the sign extraction circuit and the adder-subtractor circuit. The gating circuit may use the skip signal to control the write-enable input of the accumulator register, and the write-enable input may be stable before the arithmetic result arrives at the data input of the accumulator register.

Multiple multiply-accumulate units may be arranged in parallel within a neural network accelerator to provide throughput scaling for neural network inference and other applications. Each multiply-accumulate unit in the parallel arrangement may operate independently, receiving its own operand pair and maintaining its own accumulator register. The parallel multiply-accumulate units may share common control signals such as clock and reset while operating on different data elements.

The parallel arrangement of multiply-accumulate units may enable processing of multiple elements of a dot product or matrix multiplication operation simultaneously. In neural network inference applications, the parallel multiply-accumulate units may process multiple weight-activation pairs in parallel, with each multiply-accumulate unit computing a partial sum for a different output element or a different portion of the same output element. The accumulator registers of the parallel multiply-accumulate units may store intermediate results that are later combined to produce final output values.

The parallel multiply-accumulate units may share the same two-bit encoding scheme for operands, enabling consistent zero detection and sign extraction across the array. The skip rate achieved by the parallel arrangement may depend on the sparsity characteristics of the workload, with higher operand sparsity resulting in higher skip rates and greater power savings from conditional accumulation.

The parallel multiply-accumulate units may be implemented using standard digital logic primitives without dedicated multiplier or DSP resources. The logic utilization of the parallel arrangement may scale linearly with the number of multiply-accumulate units, dominated by the accumulator registers and adder-subtractor circuits. The absence of dedicated multiplier resources may enable implementation on FPGA devices with limited DSP block availability or on ASIC processes where multiplier area is constrained.

A number of implementations have been described. Nevertheless, it will be understood that various modifications may be made without departing from the spirit and scope of the disclosure. Accordingly, other implementations are within the scope of the following claims.

The invention claimed is:

1. A multiply-accumulate unit, comprising:

a first input configured to receive a first operand encoded using a two-bit encoding scheme in which a ternary value is represented by two bits, wherein the two bits being different indicates a computable value and the two bits being identical indicates a non-computable value;

a second input configured to receive a second operand;

a zero detection circuit comprising a logic gate configured to compare the two bits of the first operand and generate a skip signal when the two bits are identical;

an arithmetic circuit configured to perform an accumulation operation based on the first operand and the second operand;

an accumulator register configured to store a result of the accumulation operation; and a gating mechanism configured to selectively perform or bypass the accumulation operation based on the skip signal, wherein when the skip signal indicates that the first operand is a non-computable value, the accumulation operation has no effect on a value stored in the accumulator register.

2. The multiply-accumulate unit of claim 1, wherein the gating mechanism comprises a gating circuit configured to prevent writing to the accumulator register when the skip signal indicates that the first operand is a non-computable value.

3. The multiply-accumulate unit of claim 1, wherein the gating mechanism is configured to present a zero-valued delta to the arithmetic circuit when the skip signal indicates that the first operand is a non-computable value, such that the accumulator register is written with an unchanged value.

4. The multiply-accumulate unit of claim 1, wherein the logic gate comprises an XNOR gate that outputs a logic high value when the two bits of the first operand are identical.

5. The multiply-accumulate unit of claim 1, wherein the two-bit encoding scheme encodes a zero value as two identical bits and encodes positive one and negative one as two different bits.

6. The multiply-accumulate unit of claim 5, wherein the two-bit encoding scheme encodes a reserved value as two identical bits that differ from the two identical bits encoding the zero value.

7. The multiply-accumulate unit of claim 1, wherein the second operand is encoded using the two-bit encoding scheme, and wherein the zero detection circuit further comprises a second logic gate configured to compare two bits of the second operand and generate a second skip signal when the two bits of the second operand are identical.

8. The multiply-accumulate unit of claim 7, further comprising a combining circuit configured to combine the skip signal and the second skip signal to produce a combined skip signal, wherein the gating mechanism causes the accumulation operation to have no effect on the value stored in the accumulator register when the combined skip signal indicates that at least one of the first operand or the second operand is a non-computable value.

9. The multiply-accumulate unit of claim 8, wherein the combining circuit comprises an OR gate.

10. A method for performing multiply-accumulate operations, comprising:

receiving a first operand encoded using a two-bit encoding scheme in which ternary values are represented by two bits, wherein differing bits indicate a computable value and identical bits indicate a non-computable value;

receiving a second operand;

detecting whether the first operand is a non-computable value by comparing the two bits of the first operand using a single logic gate to generate a skip signal;

when the skip signal indicates the first operand is a computable value, performing an accumulation operation and writing a result to an accumulator register; and when the skip signal indicates the first operand is a non-computable value, causing the accumulation operation to have no effect on an accumulated result stored in the accumulator register.

11. The method of claim 10, wherein causing the accumulation operation to have no effect comprises maintaining a prior value in the accumulator register without performing a write operation.

12. The method of claim 10, wherein causing the accumulation operation to have no effect comprises presenting a zero-valued delta to an adder circuit such that the accumulator register is written with an unchanged value.

13. The method of claim 10, wherein detecting whether the first operand is a non-computable value comprises performing an XNOR operation on the two bits of the first operand.

14. The method of claim 10, wherein the two-bit encoding scheme encodes a zero value as two identical bits and encodes positive one and negative one as two different bits.

15. The method of claim 10, wherein performing the accumulation operation comprises:

determining a sign of a product of the first operand and the second operand by performing an XOR operation on a most significant bit of the first operand and a most significant bit of the second operand; and selectively adding or subtracting a value to or from a current value of the accumulator register based on the determined sign.

16. A computing accelerator, comprising:

a plurality of multiply units, each multiply unit comprising:

an input circuit configured to receive a first operand encoded using a two-bit ternary encoding in which computable ternary values of positive one and negative one are represented by bit patterns having differing bits and non-computable values are represented by bit patterns having identical bits;

a zero detection circuit comprising an XNOR gate configured to detect when the first operand has identical bits and generate a skip signal; and a sign extraction circuit configured to determine a sign of a product based on a most significant bit of the weight operand; and an accumulation circuit configured to accumulate products from the plurality of multiply units, wherein a product corresponding to a non-computable operand contributes nothing to an accumulated result.

17. The computing accelerator of claim 16, wherein the accumulation circuit comprises a plurality of accumulator registers, each accumulator register associated with a respective multiply unit and having a write-enable input coupled to the skip signal of the respective multiply unit, wherein the write-enable input is deasserted when the skip signal indicates the weight operand is a non-computable value.

18. The computing accelerator of claim 16, wherein the accumulation circuit comprises an adder tree configured to receive products from the plurality of multiply units and reduce the products to a single accumulated value, wherein a zero-valued product from a multiply unit having a non-computable operand propagates through the adder tree as an additive identity.

19. The computing accelerator of claim 16, wherein the two-bit ternary encoding encodes a zero value as a bit pattern of two identical bits and encodes a reserved value as a different bit pattern of two identical bits, and wherein the XNOR gate detects both the zero value and the reserved value as non-computable values.

20. The computing accelerator of claim 16, wherein the sign extraction circuit comprises an XOR gate configured to receive the most significant bit of the weight operand and a most significant bit of an activation operand.

* * * * *